United States Patent [19]
Nilsson

[11] Patent Number: 4,499,936
[45] Date of Patent: Feb. 19, 1985

[54] COLLAPSIBLE BOW SAW

[76] Inventor: Göran A. Nilsson, P.O. Box 61, 82022 Sandarne, Sweden

[21] Appl. No.: 536,254

[22] Filed: Sep. 27, 1983

[30] Foreign Application Priority Data

Oct. 13, 1982 [SE] Sweden ................................ 8205812

[51] Int. Cl.³ .............................................. B27B 21/00
[52] U.S. Cl. ................................................... 145/33 E
[58] Field of Search ............................ 145/33 E, 33 R

[56] References Cited

U.S. PATENT DOCUMENTS

| | | | |
|---|---|---|---|
| 2,930,420 | 3/1960 | Brion | 145/33 E |
| 3,339,602 | 9/1967 | Wilson | 145/33 E |
| 3,905,409 | 9/1975 | Bradley | 145/33 E |

FOREIGN PATENT DOCUMENTS 201764  2/1966  Sweden ............................ 145/33 E Primary Examiner—Frederick R. Schmidt
Assistant Examiner—J. T. Zatarga
Attorney, Agent, or Firm—Spencer and Frank

[57] ABSTRACT

A bow saw having a frame and a saw blade which is tightened between the opposite ends of the frame when used. The frame is composed of three individual elements which are interconnected by means of simple and cheap connections and which are firmly held together as long as a tensile stress is maintained in the blade by means of screw members. These elements are collapsible in order to reduce the size of the saw. To this end a main element has a cavity for housing the blade, while two end elements have cavities allowing the main element to be partially introduced therein.

2 Claims, 4 Drawing Figures

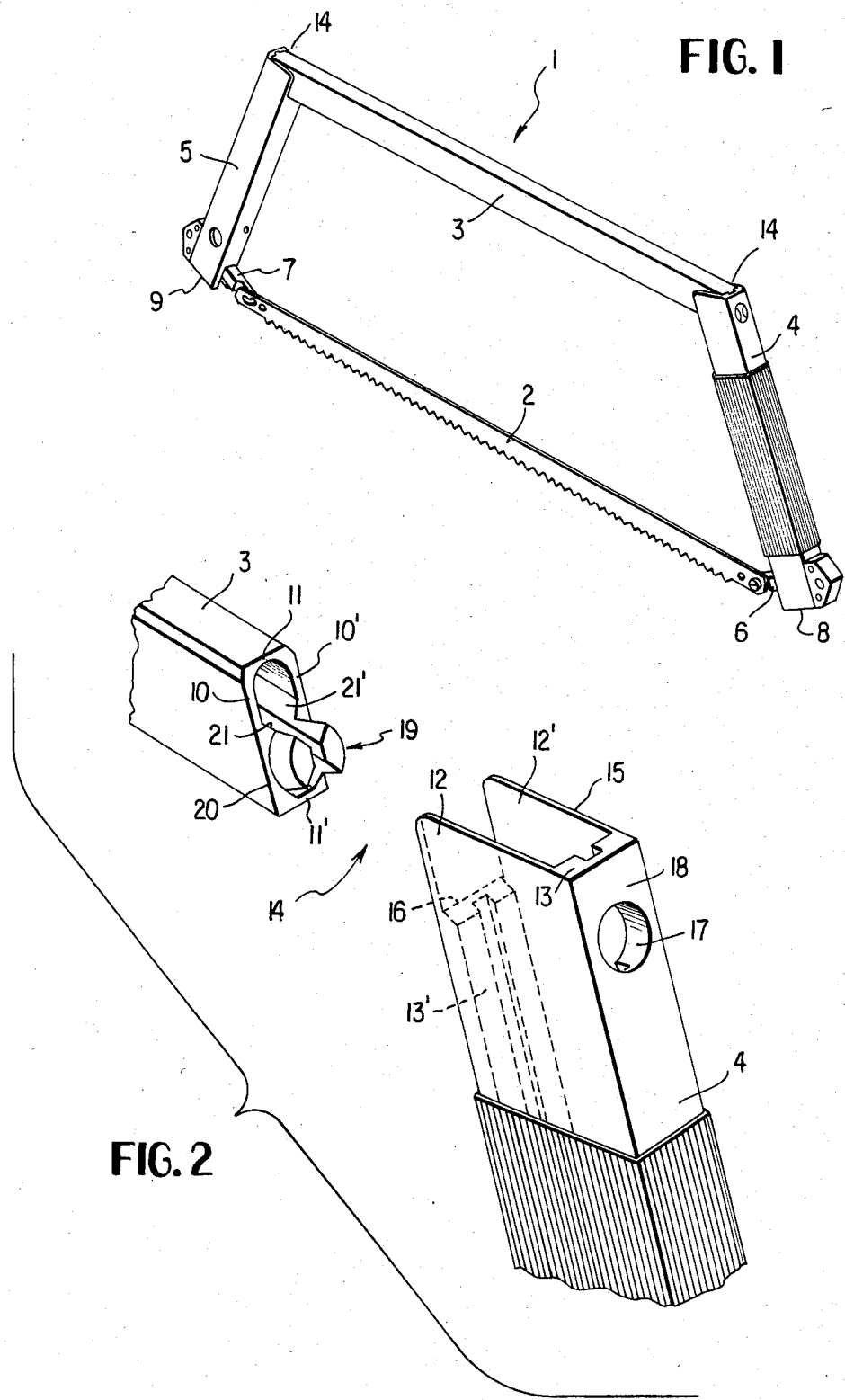

COLLAPSIBLE BOW SAW

BACKGROUND OF THE INVENTION

This invention relates to a collapsible bow saw comprising a frame and a long saw blade which, when the saw is stretched in use is tight between opposite end portions of the frame. The frame is composed of three individual hollow elements, namely a main element extending in spaced relation to the saw blade and two end elements which, when the saw is in use, extend between the ends of the main element and the ends of the blade and which are connected to the main element while forming a rigid frame as long as a tensile stress is maintained in the blade. The main element and the end elements have different cross sectional dimensions so as to allow the elements to be telescoped into each other. after separation of the end elements from the saw blade and to allow the blade to be telescoped into a sheltered position in the cavities of said elements.

Collapsible bow saws are previously known, as in U.S. Pat. No. 2,930,420 and German Offenlegungsschrift No. 1,926,446. These saws do, however, suffer from a number of drawbacks, e.g. poor rigidity of the frame when in a mounted condition and high manufacturing costs due to the fact that the frame is composed of a great number of components which call for a plurality of working moments.

In the saw disclosed in the above-mentioned U.S. Pat. No. 2,930,420, neither the main element nor the end elements have box profiles with closed cross sections. Instead they have U-shaped profiles with open slots through which the saw blade passes when the saw is collapsed and mounted, respectively. These slots drastically reduce the inherent rigidity of the three frame elements and make them apt to become distorted or deformed as soon as the saw blade is subjected to even moderate tensile stresses. Furthermore the end elements are intended to be introduced into the main element and not the other way around, so that the portion gripped by the hand of the user will be more slender than the main element and thereby less comfortable to manipulate. To this should be added the fact that an individual connection between the main element and one of the end elements calls for special stop pins and special guiding grooves having a complicated shape. This makes the construction unsuitable for convenient mass production.

In German Offenlegungsschrift No. 1,926,446 it is true that the main element itself has a box profile with a closed cross section, but the two end elements consist of thin, slender, flat bars which on one hand are not capable of giving the desired rigidity to the frame in its entirety and on the other hand are not suited for gripping by the hand of the user. For the last-mentioned reason it is necessary to arrange a special handle, which considerably increases the price of the saw in its entirety. Moreover the construction is unsuitable for convenient mass production since the connection between the main element and a single end element requires a plurality of operations and a plurality of components in the shape of separate gable plates, stop screws, springs, balls, et cetera. Put together these factors mean that the total manufacturing cost becomes extremely high and that the saw is consequently poorly competitive in commerce.

SUMMARY OF THE INVENTION

The object of the present invention is to provide a collapsible bow saw, the frame of which is rigid and handy as well as being suited for convenient mass production, while reducing the manufacturing costs to a minimum. According to the invention this is achieved by the fact that the main element has a box profile with a closed cross section and a cavity which is wider than the greatest cross sectional dimension of the blade, the exterior of said profile being smaller than the cavities in two elements and which also have a closed cross section, the main element being telescopically moveable into the two end elements after the saw is dismantled. To prepare the saw for use the main element is connected at an obtuse angle to an individual end element the main element between two side flanges of the end element, with one of two traverse flanges provided on the main element, namely a transverse flange directed towards the interior of the frame, abutting against a fulcrum provided by an end edge of an analogous inner transverse flange on the end element. The extremity of the main element has a protrusion located close to the inner transverse flange of the man element, said protrusion being—when the saw is prepared for use—introduced into a hole provided in the outer transverse flange of the end element at a distance spaced apart from the extremity of the end element.

Due to the fact that the main element as well as the two end elements in accordance with the invention have box profiles with completely closed cross sections, the frame has extraordinarily great rigidity and stability when in use, and the saw blade may be subjected to extremely great tensile stresses without any tendency of the three box profiles to become distorted or otherwise deformed. Since the main element—when the saw is collasped—is arranged to be introduced into the end elements, it is the latter elements that have the widest cross sections. This is important to the user because his hand will then have something solid to catch hold of. Another significant advantage of the bow saw according to the invention is that it provides exceptionally firm and tight connections between the main element and the end elements in spite of the absence any supplementary components in addition to the box profiles as such. Thus the above-mentioned protrusion at the extremity of the main element may be produced by means of a single, and simple cutting or machining operation and a single, and simple hole—which is provided in an end element and co-operates with said protrusion—will be fully sufficient for providing the desired firm connection between the elements. This makes the saw particularly suited for a convenient and economically advantageous mass production since the number of components as well as the number of necessary working moments are reduced to an absolute minimum.

BRIEF DESCRIPTION OF THE DRAWINGS

In FIG. 1 is a perspective view showing the saw according to the invention when it is prepared for use;

FIG. 2 is an enlarged perspective view illustrating the connection between two elements included in the frame of the saw;

DESCRIPTION OF THE PREFERRED EMBODIMENT

Figure 3:
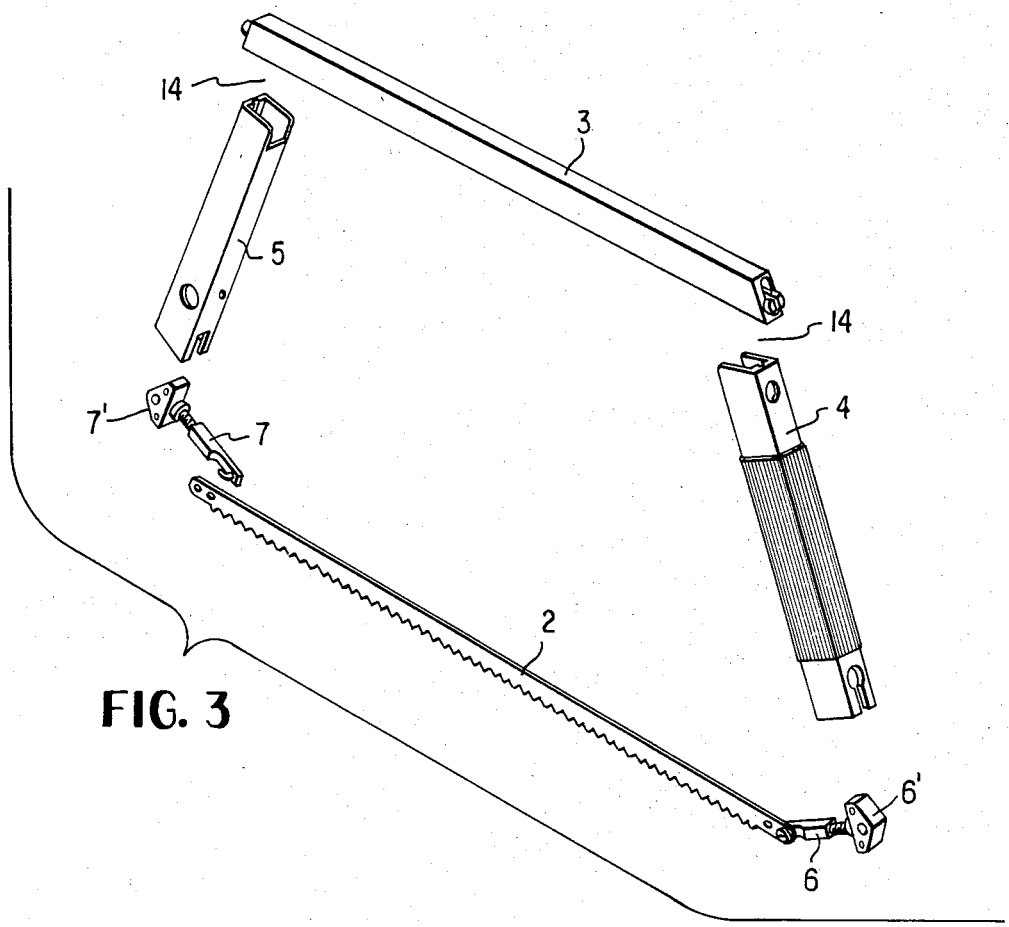
FIG. 3 is an exploded perspective view illustrating the various components included in the saw in a dismantled condition.

The bow saw shown in FIG. 1 comprises a frame generally designated by the numeral 1 as well as a long saw blade 2 of the usual type. The frame 1 is composed of three individual elements 3, 4, and 5, which are firmly held together as long as the blade 2 is stretched tight. In the embodiment shown the first-mentioned element, or main element 3, is somewhat longer than the two other elements, or end elements 4 and 5, and somewhat shorter than the saw blade 2, while the end element 4 is somewhat longer than the end element 5. Due to these size relationships the frame 1 has a shape which in all essentials corresponds to the preferred shape of conventional bow saws. In FIG. 1 the reference numerals 6 and 7 designate two screw members, the purpose of which is to tighten the blade 2 between the two opposite end portions 8 and 9 of the frame after it is assembled.

The elements 3, 4, and 5 each have box profiles, preferably box profiles having rectangular cross sections. More precisely the main element 3 has a box profile the outer contour of which is slightly smaller than the inner contours of the two end elements 4 and 5. This appears from FIG. 2, which illustrates the fact that the main element 3 has a box profile comprising two side flanges 10 and 10' and two transverse flanges 11 and 11' the width of which is smaller than the height of said side flanges. In practice the height of the box profile provided by main element 3 may be approximately twice the width thereof. Likewise the end element 4 (as will as the end element 5) has a box profile with two side flanges 12 and 12' and two transverse flanges 13 and 13'. The inner sectional area of an outer box profile provided by end element 4 or 5 may advantageously be only slightly greater than the outer sectional area of the main element 3 so as to make the latter fit rather tightly into end elements 4 and 5 respectively. It should also be mentioned that the height of the interior cavity in main element 3 is sufficient to permit the saw blade 2 to be housed therein, as shown in FIG. 4.

Now reference is made to FIG. 2 which illustrates in detail the connection between the main element 3 and an end element, in this case the element 4, said connection being generally designated by the numeral 14. In order to provide this connection the transverse flange 13' of the end element 4 is cut off at a certain distance from the extremity 15 of said element to form an end edge 16 serving as a fulcrum. Moreover a hole or recess 17 is made in the transverse flange 13, said hole having a circular shape in this case. Thus a piece of material designated by the numeral 18 is left between said hole 17 and the extremity 15. From FIGS. 1 and 2 it is evident that the end portion of the main element 3 may be introduced between the side flanges 12 and 12' of the element 4 and may be located at an obtuse angle relative to the element 4. The lower or inner transverse flange 11' will then abut the fulcrum formed by the end edge 16 of the transverse flange 13' of element 4. The hole 17 in the transverse flange 13 is located at a position spaced apart from the extremity 15 of the element 4 so as to give the material portion 18 a relatively great length. A head or protrusion 19 is formed at the extremity 20 of the main element 3 for the purpose of fitting into the hole 17. This head consists of two individual members forming parts of two thickened ribs 21 and 21' which are integral with the side flanges 10 and 10' of the main element end placed on the inside thereof. The extremity or end surface 20 of the element 3 is inclined relative to the length of said element so as to make sure that said extremity will properly follow and contact the inner surface of the transverse flange 13 of the element 4. When the blade 2 is tightened by means of the screw members 6 and 7 the elements 3 and 4 tend to rotate towards each other so as to decrease the angle between the elements. This provides a clamping action between the head 19 and the upper contact surface of the hole 17, said clamping action safely securing the elements 3 and 4 (and elements 3 and 5) in the position shown in FIG. 1. Tests have shown that the elements 3, 4, and 5, will be steadfastly secured to each other by means of the connection, which is extremely simple and cheap to produce.

In order to achieve a connection free from play it is essential that the exterior of the side flanges 10 and 10' of the element 3 has a rather tight fit in relation to the interior of the side flanges 12 and 12' of the elements 4 and 5 respectively.

Figure 4:
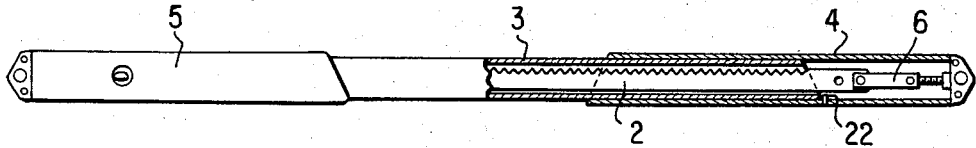
FIG. 4 is a side elevational view showing the collapsed saw in its entirety.

As appears from FIG. 4 a spacing member 22 is arranged on the inside of the end element 4, said member co-operating with a corresponding member (not shown) on the inside of the end element 5 in order to keep said elements at a certain distance from each other when they are passed onto the main element 3. More precisely the end elements 4 and 5 are spaced a distance which allows the blade 2 to be fully enclosed in the cavities of all of the three elements 3, 4, and 5, with the stop blocks 6' and 7' of the screw members 6 and 7 contacting the opposite extremities of the end elements 4 and 5.

When assembled for use as shown in FIG. 1, the saw operates as a conventional bow saw since the elements 3, 4, and 5 together form a rigid frame as long as a tensile stress is maintained in the saw blade 2 by means of the screw members 6 and 7.

When the sawing operation has been finished, the saw can be folded for safety or transportation in the following manner: The screw member 7 is unscrewed and loosened from the blade 2 so as to disengage the blade from the respective end elements 4 and 5. In the next step the two end elements 4 and 5 are rotated about the points of connection 14 so as to locate the end elements along a line running through the main element. In this position they are pushed onto the main element until the spacing members 22 contact the extremities of said main element. Thereafter the blade 2 is introduced into the cavity confined by the hollow elements 3, 4, and 5. When the blade is located in said cavity the screw members 6 and 7 are again tightened in order to firmly clamp the blade between the opposite extremities of the end elements 4 and 5 as shown in FIG. 4.

Thus the components included in the saw form one single and compact unit from which the individual components cannot be unintentionally loosened.

When the collapsed saw shown in FIG. 4 is assembled again one proceeds in the reverse manner.

Of course the invention is not limited to the single embodiment shown in the drawings. Thus it is possible to use other spacing means than the members attached to the inside of the end elements, e.g. a sleeve mounted on the outside of the main element. It should also be mentioned that the cavity of the main element may be wide enough to house more than one saw blade. In practice the box profiles provided by the main elements and end elements respectively may consist of extruded aluminium.

What I claim is:

1. In a collapsible bow saw having an elongated saw blade, having a hollow main element with an axis and ends, having two hollow end elements with ends and with cross sectional dimensions that are different from the cross sectional dimensions of the main element so as to allow the elements to be telescoped into each other and to allow the blade to be telescoped into a sheltered position within the elements when the saw is not assembled for use, and having connecting means for connecting the end elements to the ends of the main element when the saw is assembled for use, the blade being tightly stretched between the end elements at a position spaced apart from the main element when the saw is assembled for use so as to form a rigid frame as long as tensile stress is maintained in the blade, the improvement comprising:

said hollow main element and hollow end elements have internal internal cavities and have box profiles with closed cross sections, the cavity in the main element being wider than the maximum width of the blade and the exterior of the main element having cross sectional dimensions that are smaller than the cross sectional dimensions of the cavities in the end elements so that the main element is telescopically movable into the end elements when the saw is not assembled for use; and said connecting means includes a chamfered extremity having a protrusion provided on the main element at each end thereof and first and second transverse flanges provided on the main element at each end thereof, the chamfered extremity being disposed between the first and second transverse flanges and the protrusion being closer to the first transverse flange than the second, the chamfered extremity being disposed at an angle with respect to the axis of the main element, and further includes two side flanges provided on each end element adjacent an end thereof and third and fourth transverse flanges provided on each end element adjacent an end thereof, the side flanges being spaced apart and the third and fourth flanges being spaced apart between the side flanges, the third transverse flange terminating in an end edge and the fourth transverse flange having a hole which is spaced apart from the end of the end element, when the saw is assembled for use each end element being disposed at an obtuse angle with respect to the axis of the main element, said obtuse angle being substantially the same as the angle between the axis of the main element and the chamfered extremity that is closest to the end element, and when the saw is assembled for use each end of the main element being disposed between the side flanges of a respective end element with the first transverse flange abutting the end edge of the respective end element, with the protrusion extending into the hole of the respective end element, and with the chamfered extremity fitting tightly against the fourth transverse flange of the respective end element.

2. The saw of claim 1, further comprising spacing means for keeping the end elements at a predetermined distance from each other when the main element is telescopically moved into the end elements.

* * * * *